United States Patent
Yoshida

(10) Patent No.: US 7,042,596 B1
(45) Date of Patent: May 9, 2006

(54) MULTIFUNCTION APPARATUS AND METHOD OF IDENTIFYING DEVICE ATTACHED THERETO

(75) Inventor: Takashi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 09/640,663

(22) Filed: Aug. 18, 2000

(30) Foreign Application Priority Data

Aug. 24, 1999 (JP) .................................. 11-237525

(51) Int. Cl.
*G06F 13/00* (2006.01)
*G06F 15/00* (2006.01)

(52) U.S. Cl. ..................... 358/472; 358/1.13; 358/474; 347/49; 347/50

(58) Field of Classification Search ................ 358/296, 358/1.13, 472, 468, 474; 347/49, 50; 340/686.4
See application file for complete search history.

(56) References Cited

U.S. PATENT DOCUMENTS

| | | | |
|---|---|---|---|
| 4,313,124 A | 1/1982 | Hara ........................... 346/140 |
| 4,345,262 A | 8/1982 | Shirato et al. ............... 346/140 |
| 4,459,600 A | 7/1984 | Sato et al. .............. 346/140 R |
| 4,463,359 A | 7/1984 | Ayata et al. .................. 346/1.1 |
| 4,558,333 A | 12/1985 | Sugitani et al. ......... 346/140 R |
| 4,701,912 A * | 10/1987 | Bueno et al. ................ 370/474 |
| 4,723,129 A | 2/1988 | Endo et al. ................... 346/1.1 |
| 4,740,796 A | 4/1988 | Endo et al. ................... 346/1.1 |
| 5,936,740 A * | 8/1999 | Fukazawa et al. .......... 358/296 |
| 6,114,837 A * | 9/2000 | Nakanishi .................... 320/136 |
| 6,250,548 B1 * | 6/2001 | McClure et al. .............. 235/51 |
| 6,309,045 B1 * | 10/2001 | Suzuki et al. ................. 347/37 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |

* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

Disclosed is method of identifying a device that has been connected to a multifunction apparatus to which any device of a plurality of types can be selectively attached, wherein the method makes it possible to prevent malfunction if a device is attached or connected unsatisfactorily. A timing signal for acquiring information that identifies a device is transmitted to the attached device, identifying information transmitted from the attached device in accordance with the timing signal is received, and it is determined, with regard to a device of a specific type, whether specific data contained in the identifying information is indicative of a predetermined value. If it has been determined that the specific data is indicative of the predetermined value, then control is exercised on the assumption that the connected device is that of the specific type.

6 Claims, 15 Drawing Sheets

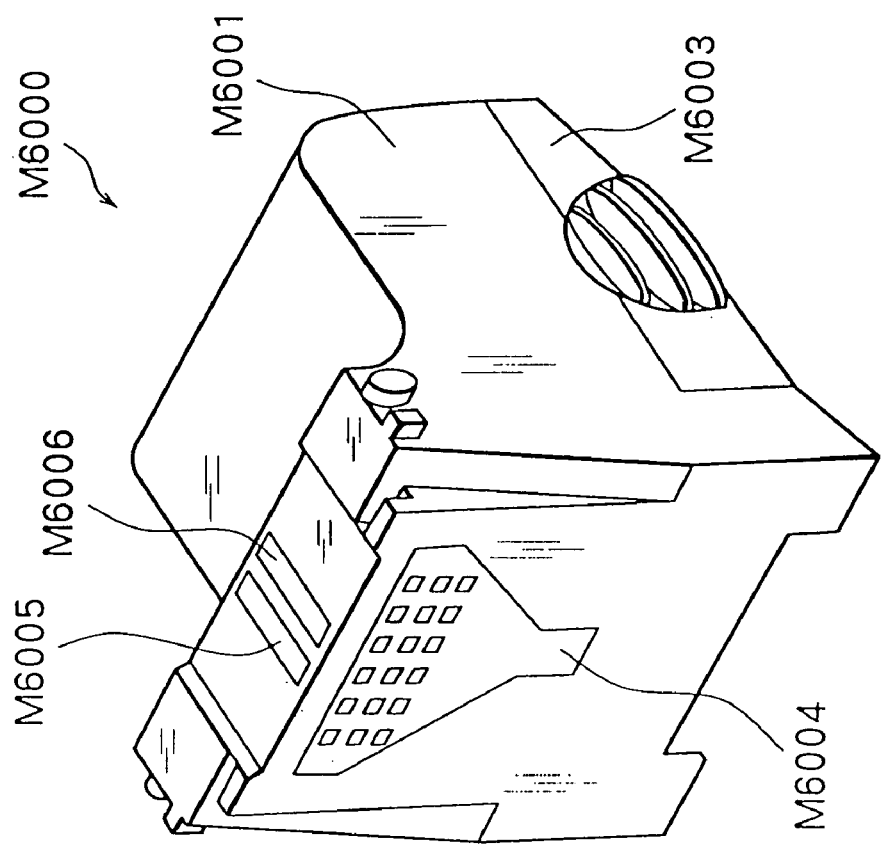
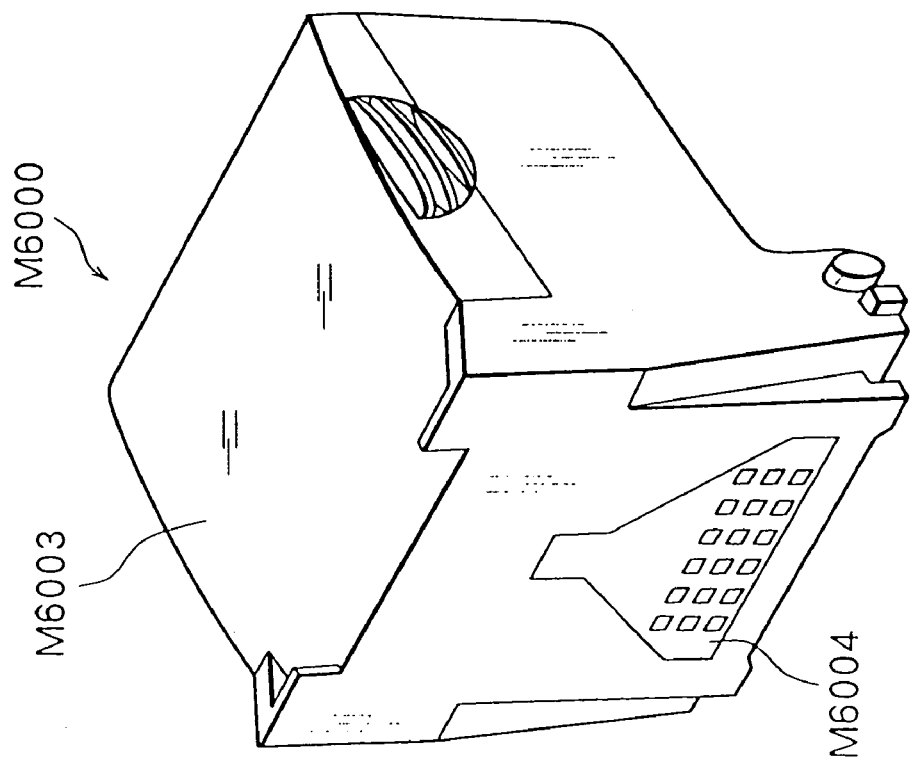

MULTIFUNCTION APPARATUS AND METHOD OF IDENTIFYING DEVICE ATTACHED THERETO

FIELD OF THE INVENTION

This invention relates to a multifunction apparatus and to a method of identifying a device that has been attached to this apparatus. More particularly, the invention relates to a multifunction apparatus, which is so adapted that any device of a plurality of types can be selectively attached thereto, for executing control that differs depending upon the type of attached device, and to a method of identifying the device that has been attached to the apparatus.

The present invention is applicable not only to a general printing apparatus but also to an apparatus such as a copier, a facsimile machine having a communication system and a word processor having a printer, and also to an industrial printing apparatus combined with a variety of processing units.

BACKGROUND OF THE INVENTION

Peripheral units that are used upon being connected to a personal computer or the like include a multifunction apparatus so adapted that any of multiple types of devices can be attached thereto selectively, with the apparatus executing a function that differs depending upon the type of device attached.

A well-known example of such a multifunction apparatus is a printer so adapted that a printhead or scanner unit can be selectively mounted on a carriage. The printer exercises control so as to execute a printing operation if the printhead has been mounted and an operation for reading a document image if the scanner head has been mounted.

A printer of the kind mentioned above is designed so as to identify the attached device by reading the device ID. Primarily, either of the two methods described below may be adopted as a method of reading an ID.

According to the first method, signal lines the number of which corresponds to the number of bits needed to discriminate an ID are provided, these signal lines are clamped to an ID value decided uniquely on the device side, and the ID is read from a controller in the apparatus. According to the second method, one data line and one synchronizing clock line are provided and the ID value is read out serially.

In the example of the prior art described above, however, the electrical connection between the device and the apparatus can become faulty if the user has not attached the device correctly or if the contacting parts become contaminated with dust or the like. This can result in the ID value being read incorrectly.

If the ID value is read incorrectly, the device will not be controlled properly and will not operate in the manner intended by the user. In addition, an inappropriate value can damage the attached device or the apparatus itself.

In order to avoid the problem mentioned above, there has been proposed an arrangement in which the connection between the multifunction apparatus and devices can be confirmed by providing the ID values of all devices that can be attached to the multifunction apparatus with header bits. However, this makes it necessary to add on circuits to all attached devices, thereby increasing the size and raising the cost of each device.

SUMMARY OF THE INVENTION

Accordingly, an object of the present invention is to provide a multifunction apparatus in which it is possible to prevent malfunction if a device is mounted or electrically connected unsatisfactorily, as well as a method of identifying a device that has been attached to the apparatus.

According to the present invention, the foregoing object is attained by providing a multifunction apparatus, which is so adapted that any device of a plurality of types can be selectively attached thereto, for executing control that differs depending upon the type of device attached, the apparatus comprising: transmitting means for transmitting a timing signal, which is for acquiring identifying information stored in an attached device, to the attached device; receiving means for receiving the identifying information that has been sent from the attached device in accordance with the timing signal; determination means for determining, with regard to a device of a specific type, whether specific data contained in the identifying information is indicative of a predetermined value; and control means for exercising control upon construing that the attached device is of the specific type in a case where the determination means has determined that the specific data is indicative of the predetermined value.

Further, according to the present invention, the foregoing object is attained by providing a method of identifying a device that has been attached to a multifunction apparatus, which is so adapted that any device of a plurality of types can be selectively attached thereto, for executing control that differs depending upon the type of device attached, the method comprising: a transmitting step of transmitting a timing signal, which is for acquiring identifying information stored in an attached device, to the attached device; a receiving step of receiving the identifying information that has been sent from the attached device in accordance with the timing signal; a determination step of determining, with regard to a device of a specific type, whether specific data contained in the identifying information is indicative of a predetermined value; and a control step of exercising control upon construing that the attached device is of the specific type in a case where the determination step has determined that the specific data is indicative of the predetermined value.

Thus, in the present invention, a timing signal for acquiring identifying information which identifies a device is transmitted to an attached device, the identifying information transmitted from the attached device in accordance with the timing signal is received, it is determined whether specific data in the identifying information is indicative of a predetermined value in regard to a device of a specific type, and if the value of the specific data is the predetermined value, control is performed on the assumption that the attached device is of the specific type.

As a result, if a device has been attached or electrically connected unsatisfactorily, it is possible to greatly reduce the possibility of malfunction caused by identifying a device erroneously on the side of the apparatus without providing a special arrangement on the device side.

Preferably, if it is determined that the specific data is not indicative of the predetermined value, notification is given of the fact that the attached device has not been electrically connected correctly.

Ideally, the identifying information is digital information comprising a plurality of bits and is transmitted serially from the attached device, the specific data comprising two or more bits transmitted in succession.

In this case, identification is facilitated if the predetermined value is such that the values of the bits thereof differ alternately.

Examples of devices are a device having an information input function and a device having an information output function.

Specific examples of devices are a scanner unit for reading a document image and a printhead cartridge for outputting an image to a printing medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B are perspective views showing a scanner cartridge in the embodiment of the present invention;

DETAILED DESCRIPTION OF THE PREFERRED EMBODIMENTS

Embodiments according to a printing apparatus of the present invention will be described below with reference to the accompanying drawings.

In the embodiment that follows, an ink-jet printer is described as an example of a multifunction apparatus. The printer can be used also as a reader by replacing a printhead with a scanner unit (referred to simply as a "scanner" below).

Reference will now be had to the drawings to give a detailed description of identification of a device that has been attached to the printer according to this embodiment.

In this specification, "print" is not only to form significant information such as characters and graphics but also to form, e.g., images, figures, and patterns on printing media in a broad sense, regardless of whether the information formed is significant or insignificant or whether the information formed is visualized so that a human can visually perceive it, or to process printing media.

"Printing media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

[Apparatus Main Body]

Figure 1:
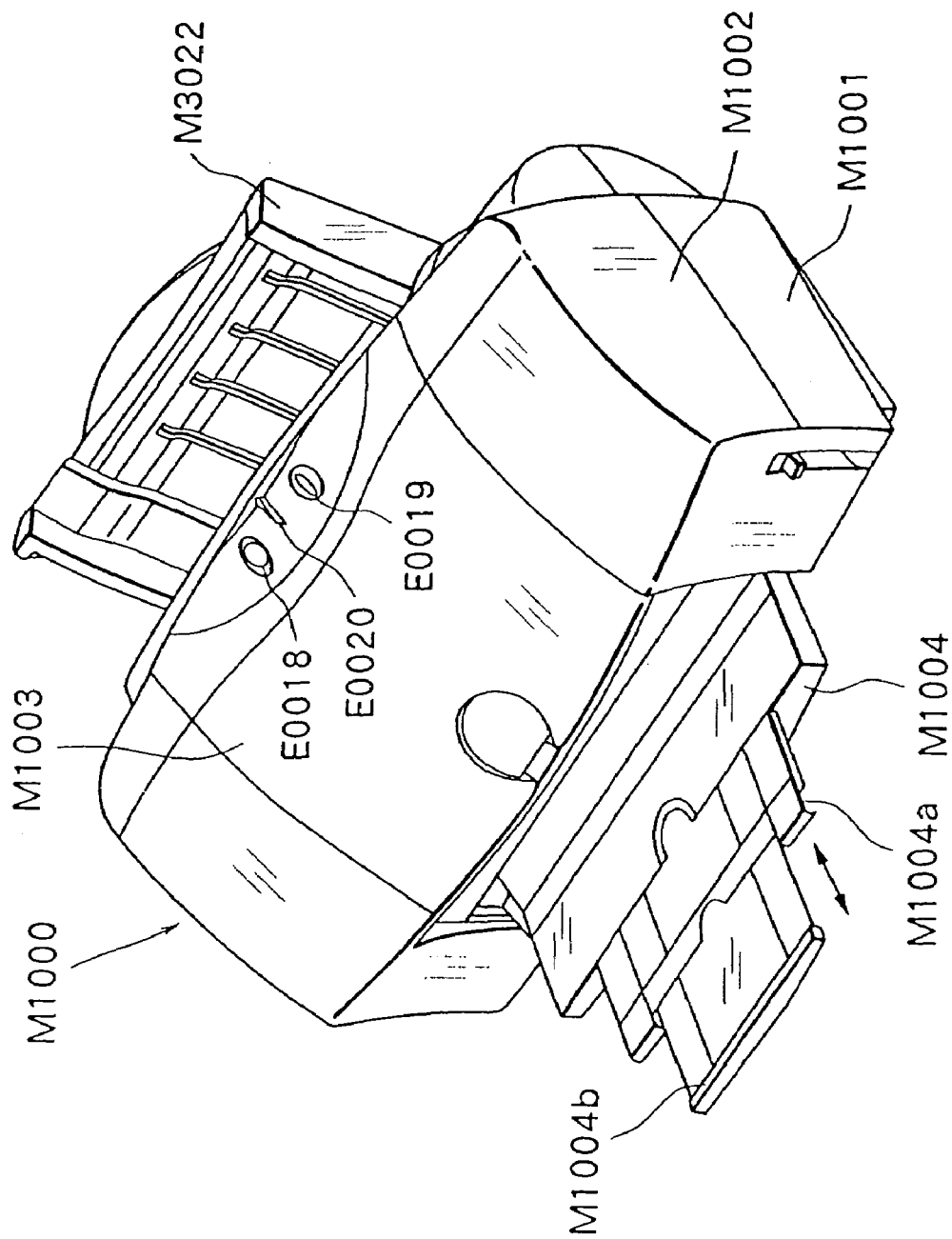
FIG. 1 is a perspective view showing the external appearance of an inkjet printer according to an embodiment of the present invention.
Figure 2:
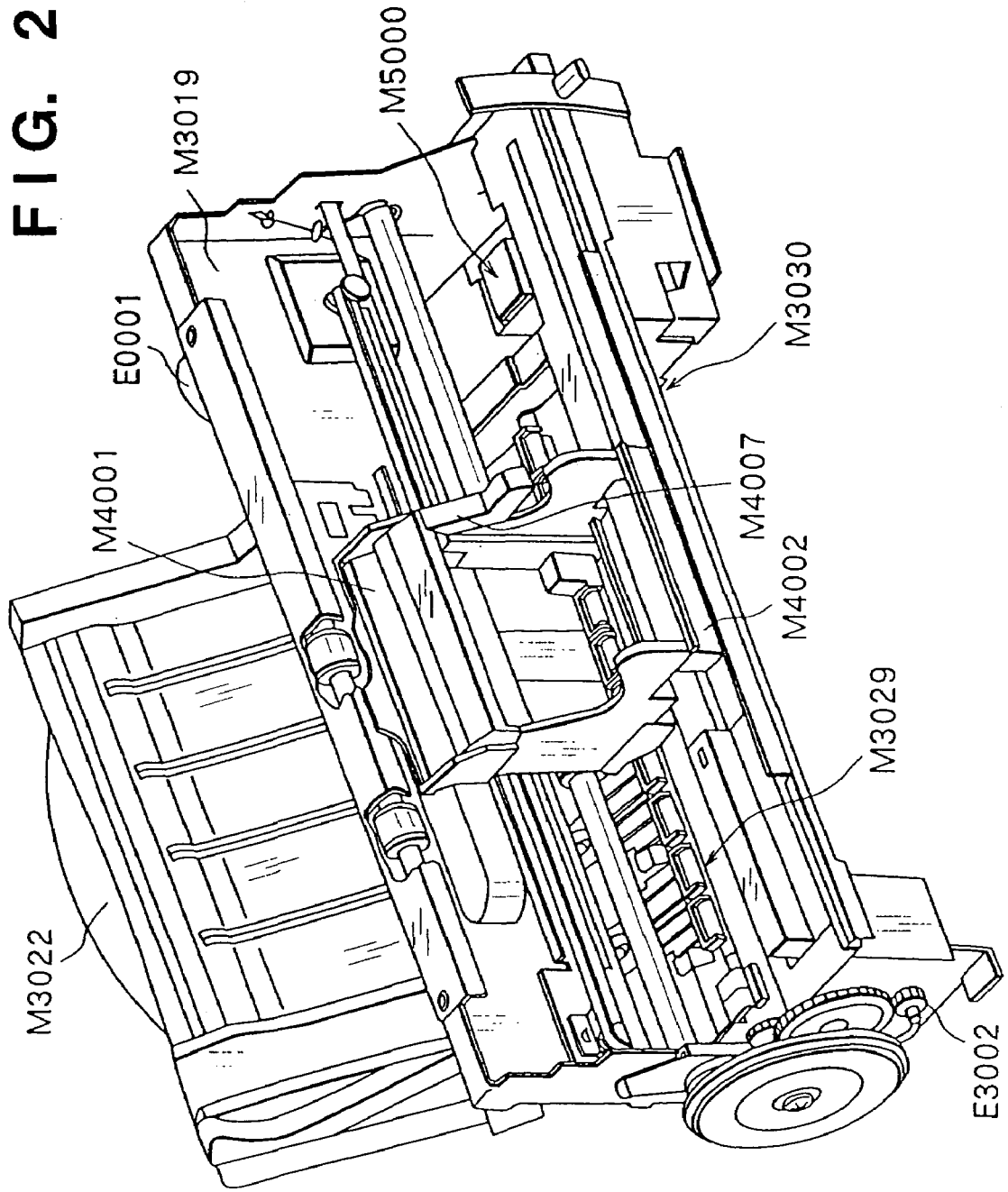
FIG. 2 is a perspective view showing the state in which external parts of the printer shown in FIG. 1 are removed.

FIGS. 1 and 2 show an outline of the arrangement of a printer using an inkjet printing system. Referring to FIG. 1, an apparatus main body M1000 as a shell of the printer according to this embodiment is composed of external members, i.e., a lower case M1001, upper case M1002, access cover M1003, and delivery tray M1004, and a chassis M3019 (FIG. 2) accommodated in these external members.

The chassis M3019 is made of a plurality of plate-like metal members having predetermined stiffness, forms a framework of the printing apparatus, and holds various printing mechanisms to be described later.

The lower case M1001 forms a substantially lower half of the apparatus main body M1000, and the upper case M1002 forms a substantially upper half of the apparatus main body M1000. The combination of these two cases forms a hollow structure having a housing space for housing diverse mechanisms to be described later. Openings are formed in the top surface and the front surface of this hollow structure.

One end portion of the delivery tray M1004 is rotatably held by the lower case M1001. By rotating this delivery tray M1004, the opening formed in the front surface of the lower case M1001 can be opened and closed. When printing is to be executed, therefore, the delivery tray M1004 is rotated forward to open the opening to allow printing sheets to be delivered from this opening, and delivered printing sheets P can be stacked in order. Also, the delivery tray M1004 accommodates two auxiliary trays M1004a and M1004b. By pulling each tray forward as needed, the sheet support area can be increased and reduced in three steps.

One end portion of the access cover M1003 is rotatably held by the upper case M1002. This allows this access cover M1003 to open and close the opening formed in the top surface of the upper case M1002. By opening this access cover M1003, a printhead cartridge H1000 or an ink tank H1900 housed inside the main body can be replaced. Although not shown, when the access cover M1003 is opened or closed, a projection formed on the rear surface of this access cover M1003 rotates a cover opening/closing lever. A microswitch or the like detects the rotated position of this lever. In this way, the open/closed state of the access cover can be detected.

Figure 7:
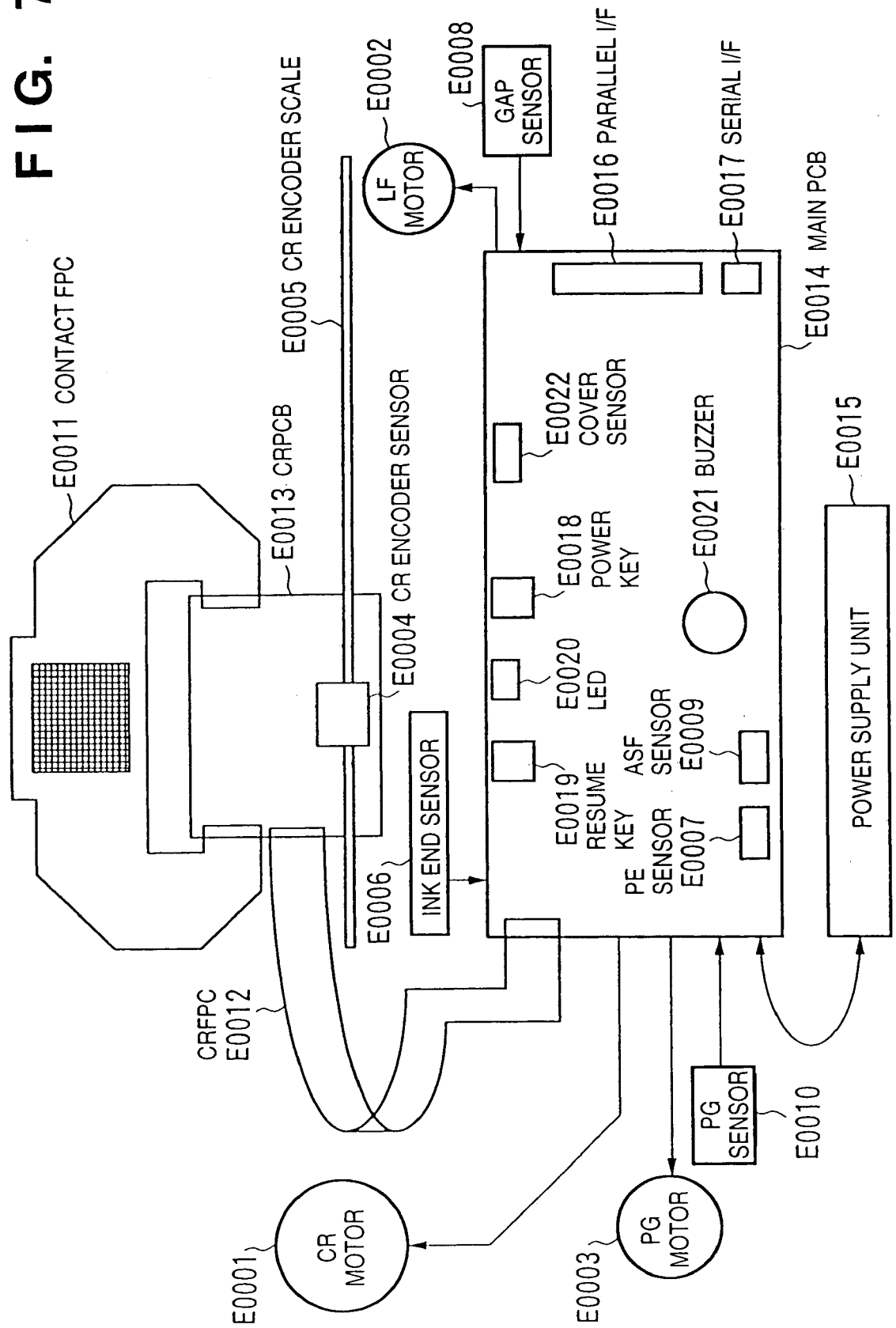
FIG. 7 is a block diagram schematically showing the overall arrangement of an electronic circuit in the embodiment of the present invention.

On the top surface in the rear portion of the upper case M1002, a power key E0018 and a resume key E0019 are arranged to be able to be pressed, and an LED E0020 is also arranged. When the power key E0018 is pressed, the LED E0020 is turned on to inform the operator that printing is possible. This LED E0020 has various display functions, e.g., informs the operator of a trouble of the printer by changing the way the LED E0020 turns on and off, changing the color of light, or sounding a buzzer E0021 (FIG. 7). When the trouble is solved, printing is restarted by pressing the resume key E0019.

[Printing Mechanisms]

Printing mechanisms of this embodiment housed in and held by the apparatus main body M1000 of the above printer will be described below.

The printing mechanisms according to this embodiment are: an automatic feeder M3022 for automatically feeding the printing sheets P into the apparatus main body; a conveyor unit M3029 for guiding the printing sheets P fed one by one from the automatic feeder to a desired printing position and guiding these recording sheets P from the printing position to a delivery unit M3030; a printing unit for performing desired printing on each printing sheet P conveyed by the conveyor unit M3029; and a recovery unit (M5000) for recovering, e.g., the printing unit.

(Printing Unit)

The printing unit will be described below.

This printing unit includes a carriage M4001 movably supported by a carriage shaft M4021, and the printhead cartridge H1000 detachably mounted on this carriage M4001.

Printhead Cartridge

First, the printhead cartridge will be described with reference to FIGS. 3 to 5.

Figure 3:
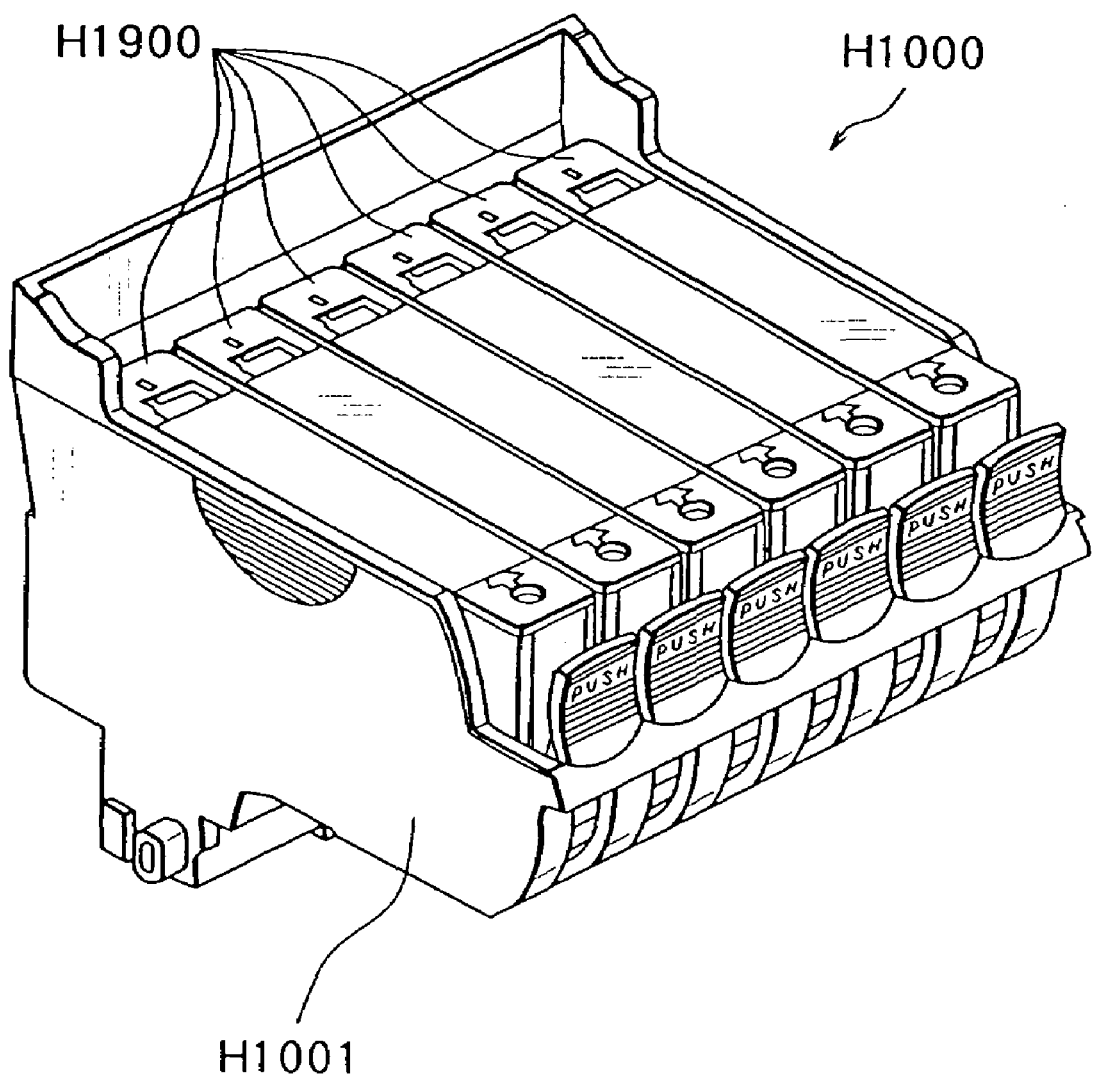
FIG. 3 is an exploded perspective view showing a printhead cartridge used in the embodiment of the present invention.
Figure 4:
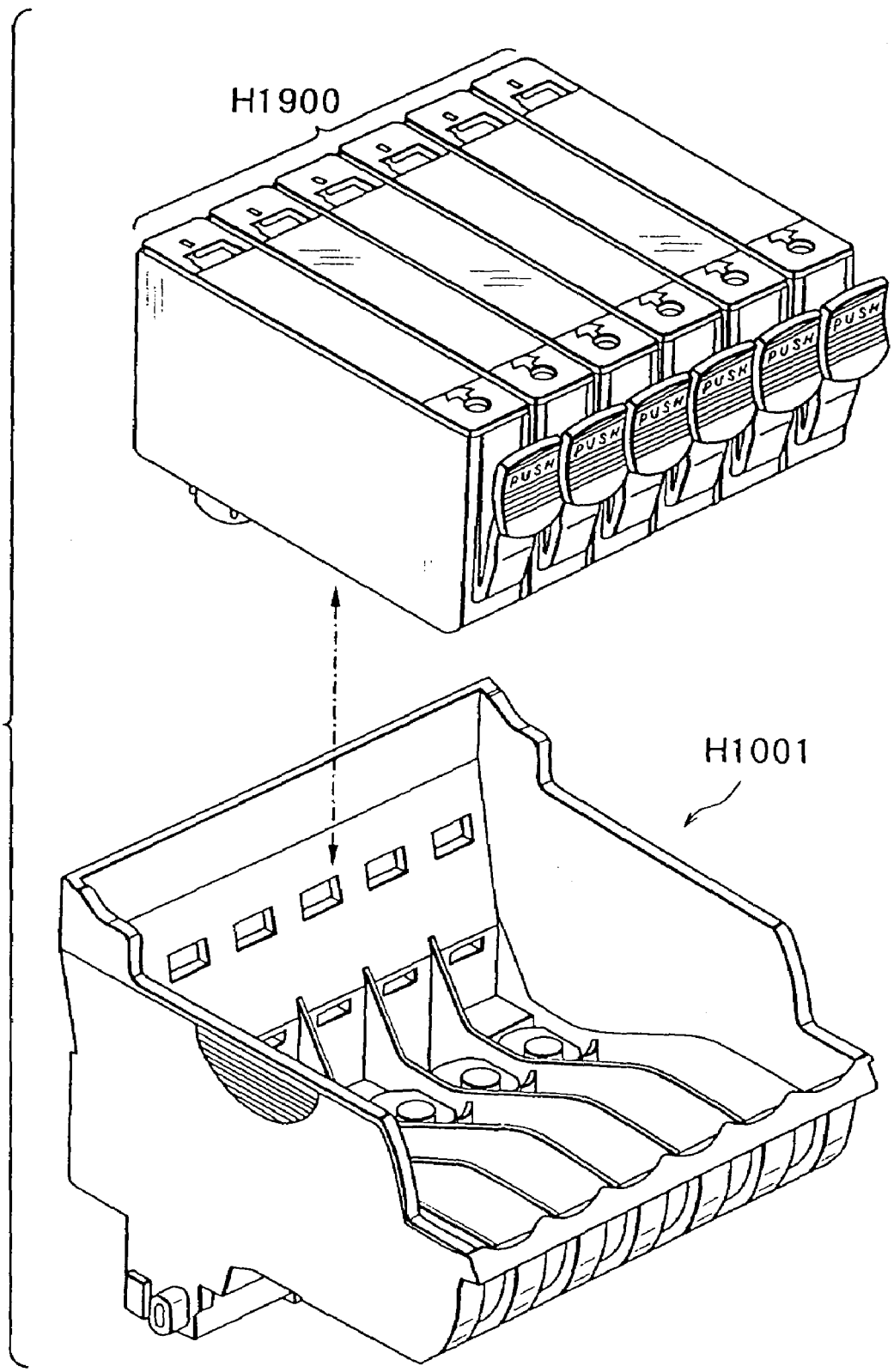
FIG. 4 is a side view showing the state in which the printhead cartridge shown in FIG. 3 is assembled.

As shown in FIG. 3, the printhead cartridge H1000 of this embodiment has the ink tank H1900 containing ink and a printhead H1001 for discharging the ink supplied from this ink tank H1900 from nozzles in accordance with printing information. This printhead H1001 is of a so-called cartridge type detachably mounted on the carriage M4001 (to be described later).

To make photographic high-quality color printing feasible, the printhead cartridge H1000 of this embodiment includes independent color ink tanks, e.g., black, light cyan, light magenta, cyan, magenta, and yellow ink tanks. As shown in FIG. 4, these ink tanks can be independently attached to and detached from the printhead H1001.

Figure 5:
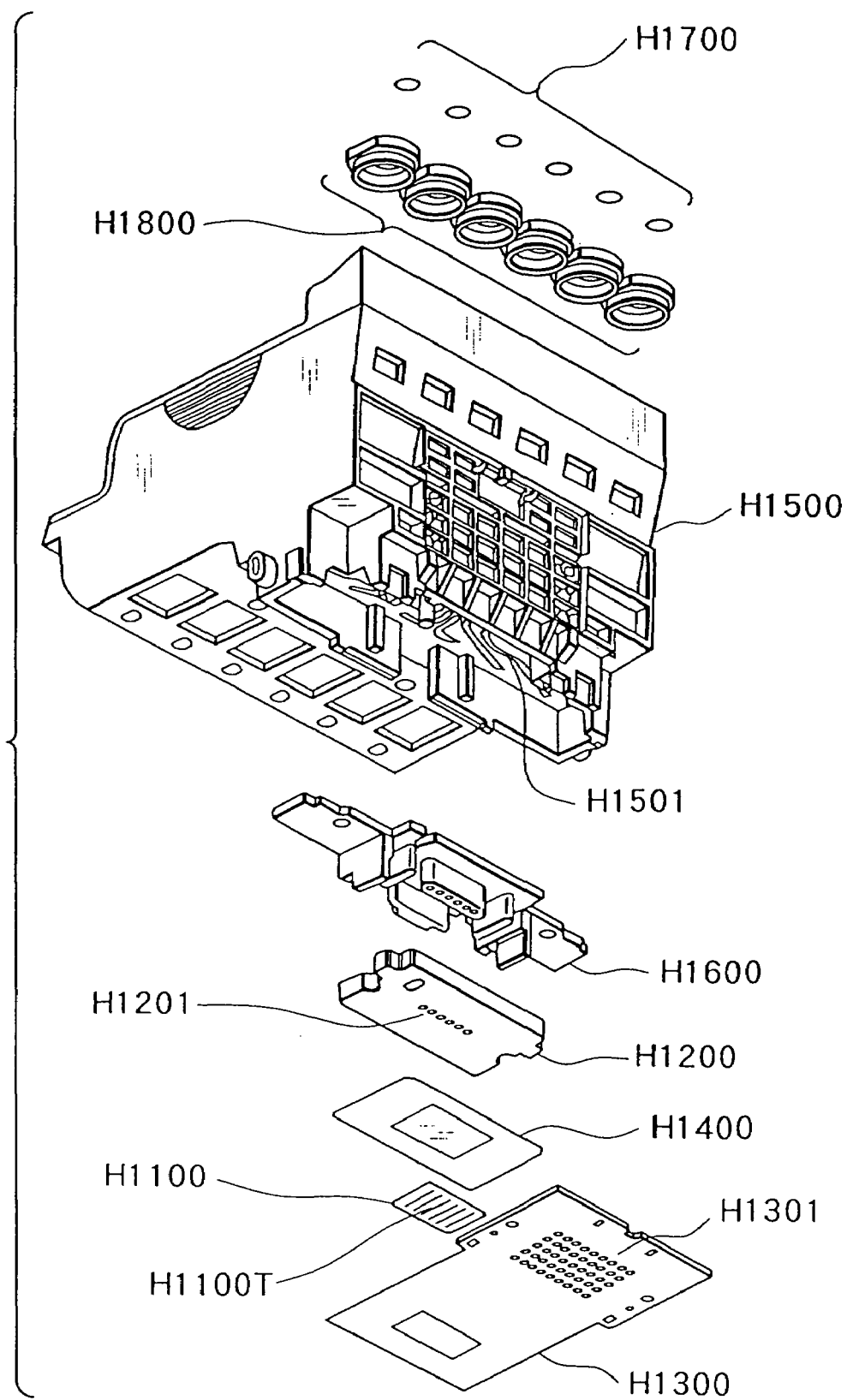
FIG. 5 is a perspective view showing the printhead of FIG. 4 when obliquely viewed from below.

As shown in an exploded perspective view of FIG. 5, the printhead H1001 comprises a printing element board H1100, first plate H1200, electrical printed circuit board H1300, second plate H1400, tank holder H1500, channel forming member H1600, filters H1700, and sealing rubber members H1800.

On the printing element board H1100, a plurality of printing elements for discharging ink and electric lines made of, e.g., Al for supplying electric power to these printing elements are formed on one surface of an Si substrate by film formation technologies. A plurality of ink channels and a plurality of discharge orifices H1100T corresponding to the printing elements are formed by photolithography. Also, ink supply ports for supplying ink to these ink channels are formed in the rear surface. This printing element board H1100 is fixed to the first plate H1200 by adhesion. Ink supply ports H1201 for supplying ink to the printing element board H1100 are formed in this first plate H1200. Furthermore, the second plate H1400 having an opening is fixed to the first plate H1200 by adhesion. This second plate H1400 holds the electric printed circuit board 1300 such that the electric printed circuit board H1300 and the printing element board H1100 are electrically connected.

This electric printed circuit board H1300 applies an electrical signal for discharging ink to the printing element board H1100. The electric printed circuit board H1300 has electric lines corresponding to the printing element board H1100, and external signal input terminals H1301 formed in end portions of these electric lines to receive electrical signals from the main body. The external signal input terminals H1301 are positioned and fixed at the back of the tank holder H1500.

The channel forming member H1600 is ultrasonically welded to the tank holder H1500 for detachably holding the ink tanks H1900, thereby forming ink channels H1501 from the ink tanks H1900 to the first plate H1200. Also, the filters H1700 are formed at those end portions of the ink channels H1501, which engage with the ink tanks H1900, to prevent invasion of dust from the outside. The sealing rubber members H1800 are attached to the portions engaging with the ink tanks H1900 to prevent evaporation of ink from these engaging portions.

Furthermore, the printhead H1001 is constructed by bonding, by an adhesive or the like, a tank holder unit composed of the tank holder H1500, channel forming member H1600, filters H1700, and sealing rubber members H1800 to a printing element unit composed of the printing element board H1100, first plate H1200, electric printed circuit board H1300, and second plate H1400.

(Carriage)

The carriage M4001 will be described below with reference to FIG. 2.

As shown in FIG. 2, this carriage M4001 includes a carriage cover M4002 and head set lever M4007. The carriage cover M4002 engages with the carriage M4001 and guides the printhead H1001 to the mount position of the carriage M4001. The head set lever M4007 engages with the tank holder H1500 of the printhead H1001 and pushes the printhead H1000 such that the printhead H1000 is set in a predetermined mount position.

That is, the head set lever M4007 is set in the upper portion of the carriage M4001 so as to be pivotal about a head set level shaft. Also, a head set plate (not shown) is set via a spring in a portion which engages with the printhead H1001. By the force of this spring, the printhead H1001 is pushed and mounted on the carriage M4001.

A contact flexible print cable (to be referred to as a contact FPC hereinafter) E0011 is set in another engaging portion of the carriage M4001 with respect to the printhead H1001. Contact portions E0011a on this contact FPC E0011 and the contact portions (external signal input terminals) H1301 formed on the printhead H1001 electrically contact each other to exchange various pieces of information for printing or supply electric power to the printhead H1001.

An elastic member (not shown) made of, e.g., rubber is formed between the contact portions E0011a of the contact FPC E0011 and the carriage M4001. The elastic force of this elastic member and the biasing force of the head set lever spring make reliable contact between the contact portions E0011a and the carriage M4001 possible. Furthermore, the contact FPC E0011 is connected to a carriage printed circuit board E0013 mounted on the back surface of the carriage M4001 (FIG. 7).

[Scanner]

The printer of this embodiment is also usable as a reading apparatus by replacing the printhead with a scanner.

This scanner moves together with the carriage of the printer and reads an original image supplied instead of a printing medium in a sub-scan direction. Information of one original image is read by alternately performing the read operation and the original feed operation.

FIGS. 6A and 6B are views showing an outline of the arrangement of this scanner M6000.

As shown in FIGS. 6A and 6B, a scanner holder M6001 has a box-like shape and contains optical systems and processing circuits necessary for reading. A scanner read lens M6006 is placed in a portion which faces the surface of an original when this scanner M6000 is mounted on the carriage M4001. This scanner read lens M6006 reads an original image. A scanner illuminating lens M6005 contains a light source (not shown), and light emitted by this light source irradiates an original.

A scanner cover M6003 fixed to the bottom portion of the scanner holder M6001 so fits as to shield the interior of the scanner holder M6001 from light. Louver-like handles formed on the side surfaces of this scanner cover M6003 facilitate attachment to and detachment from the carriage M4001. The external shape of the scanner holder M6001 is substantially the same as the printhead cartridge H1000. So, the scanner holder M6001 can be attached to and detached from the carriage M4001 by operations similar to the printhead cartridge H1000.

Also, the scanner holder M6001 accommodates a board having the processing circuits described above and a scanner contact PCB M6004 connected to this board and exposed to the outside. When the scanner M6000 is mounted on the carriage M4001, this scanner contact PCB M6004 comes in contact with the contact FPC E0011 of the carriage M4001, thereby electrically connecting the board to the control system of the main body via the carriage M4001.

An electric circuit configuration in this embodiment of the present invention will be described next.

FIG. 7 is a view schematically showing the overall arrangement of an electric circuit in this embodiment.

The electric circuit of this embodiment primarily comprises the carriage printed circuit board (CRPCB) E0013, a main PCB (Printed Circuit Board) E0014, and a power supply unit E0015.

The power supply unit is connected to the main PCB E0014 to supply various driving power.

The carriage printed circuit board E0013 is a printed circuit board unit mounted on the carriage M4001 (FIG. 2) and functions as an interface for exchanging signals with the printhead through the contact FPC E0011. Also, on the basis of a pulse signal output from an encoder sensor E0004 in accordance with the movement of the carriage M4001, the carriage printed circuit board E0013 detects changes in the positional relationship between an encoder scale E0005 and the encoder sensor E0004 and outputs a signal to the main PCB E0014 through a flexible flat cable (CRFFC) E0012.

The main PCB is a printed circuit board unit for controlling driving of individual parts of the inkjet printing apparatus of this embodiment. This main PCB has, on the board, I/O ports for, e.g., a paper end sensor (PE sensor) E0007, an ASF sensor E0009, a cover sensor E0022, a parallel interface (parallel I/F) E0016, a serial interface (serial I/F) E0017, the resume key E0019, the LED E0020, the power key E0018, and the buzzer E0021. The main PCB is also connected to a CR motor E0001, an LF motor E0002, and a PG motor E0003 to control driving of these motors. Additionally, the main PCB has interfaces connecting to an ink end sensor E0006, a GAP sensor E0008, a PG sensor E0010, a CRFFC E0012, and the power supply unit E0015.

Figure 8:
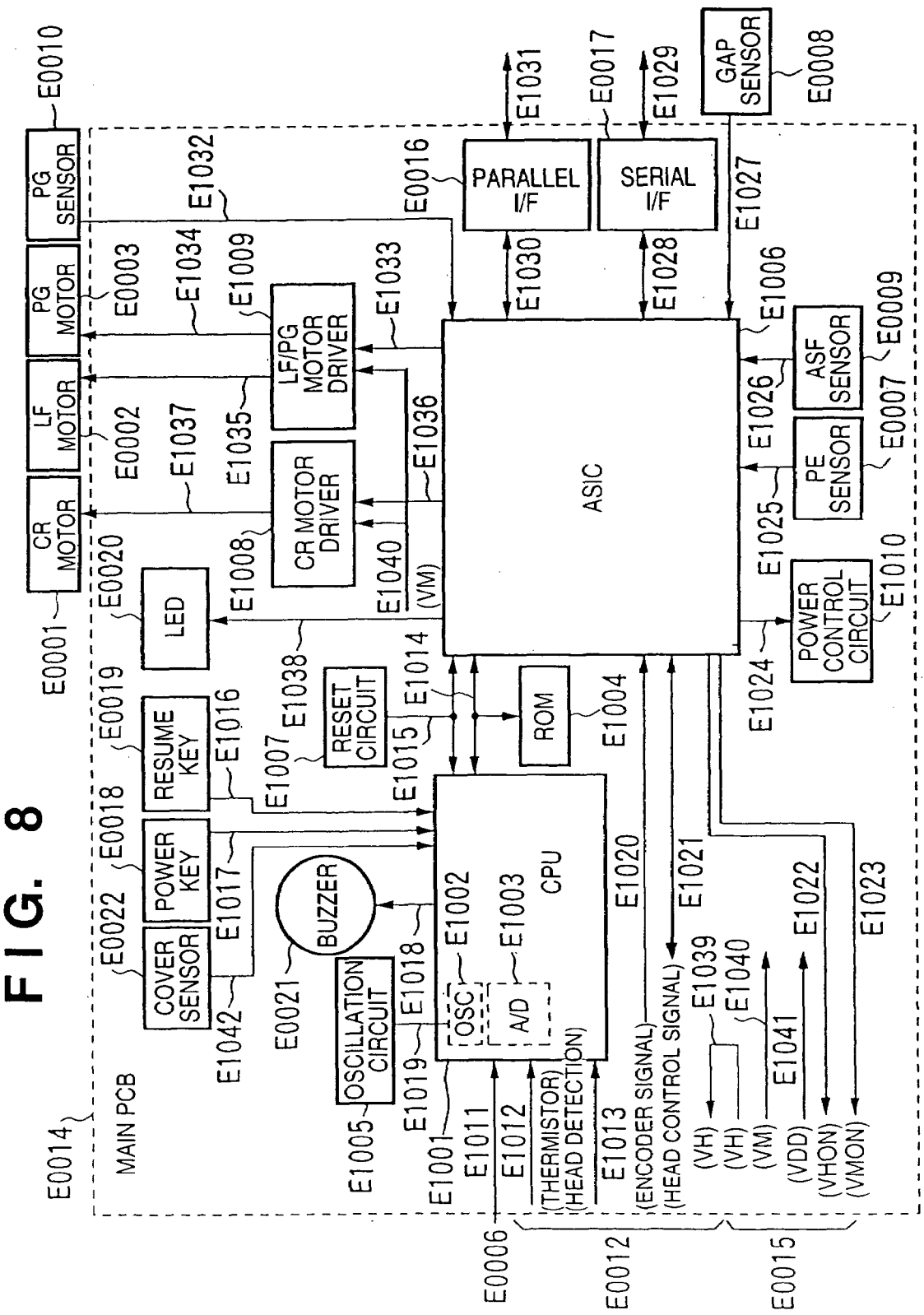
FIG. 8 is a block diagram showing the internal arrangement of a main PCB shown in FIG. 7.

FIG. 8 is a block diagram showing the internal arrangement of the main PCB.

Referring to FIG. 8, a CPU E1001 internally has an oscillator OSC E1002 and is connected to an oscillation circuit E1005 to generate a system clock by an output signal E1019 from the oscillation circuit E1005. Also, the CPU E1001 is connected to a ROM E1004 and an ASIC (Application Specific Integrated Circuit) E1006. In accordance with programs stored in the ROM E1004, the CPU E1001 controls the ASIC and senses the statuses of an input signal E1017 from the power key, an input signal E1016 from the resume key, a cover sensing signal E1042, and a head sensing signal (HSENS) E1013. Additionally, the CPU E1001 drives the buzzer E0021 by a buzzer signal (BUZ) E1018 and senses the statuses of an ink end sensing signal (INKS) E1011 and a thermistor temperature sensing signal (TH) E1012 connected to a built-in A/D converter E1003. Furthermore, the CPU E1001 controls driving of the inkjet printing apparatus by performing various logic operations and condition judgements.

The head sensing signal E1013 is a head mounting sensing signal which the printhead cartridge H1000 inputs via the flexible flat cable E0012, the carriage printed circuit board E0013, and the contact flexible print cable E0011. The ink end sensing signal is an output analog signal from the ink end sensor E0006. The thermistor temperature sensing signal E1012 is an analog signal from a thermistor (not shown) formed on the carriage printed circuit board E0013.

A CR motor driver E1008 is supplied with motor power (VM) E1040 as a driving source. In accordance with a CR motor control signal E1036 from the ASIC E1006, the CR motor driver E1008 generates a CR motor driving signal E1037 to drive the CR motor E0001. An LF/PG motor driver E1009 is also supplied with the motor power E1040 as a driving source. In accordance with a pulse motor control signal (PM control signal) E1033 from the ASIC E1006, the LF/PG motor driver E1009 generates an LF motor driving signal E1035 to drive the LF motor and also generates a PG motor driving signal E1034 to drive the PG motor.

A power control circuit E1010 controls power supply to each sensor having a light-emitting element, in accordance with a power control signal E1024 from the ASIC E1006. The parallel I/F E0016 transmits a parallel I/F signal E1030 from the ASIC E1006 to a parallel I/F cable E1031 connected to the outside, and transmits signals from this parallel I/F cable E1031 to the ASIC E1006. The serial IF E0017 transmits a serial I/F signal E1028 from the ASIC E1006 to a serial I/F cable E1029 connected to the outside, and transmits signals from this cable E1029 to the ASIC E1006.

The power supply unit E0015 supplies head power (VH) E1039, the motor power (VM) E1040, and logic power (VDD) E1041. A head power ON signal (VHON) E1022 and a motor power ON signal (VMOM) E1023 from the ASIC E1006 are input to the power supply unit E0015 to control ON/OFF of the head power E1039 and the motor power E1040, respectively. The logic power (VDD) E1041 supplied from the power supply unit E0015 is subjected to voltage transformation where necessary and supplied to individual units inside and outside the main PCB E0014.

The head power E1039 is smoothed on the main PCB E0014, supplied to the flexible flat cable E0011, and used to drive the printhead cartridge H1000.

A reset circuit E1007 detects a decrease in the logic power-supply voltage E1040 and supplies a reset signal (RESET) E1015 to the CPU E1001 and the ASIC E1006 to initialize them.

This ASIC E1006 is a one-chip semiconductor integrated circuit which is controlled by the CPU E1001 via a control bus E1014, outputs the CR motor control signal E1036, the PM control signal E1033, the power control signal E1024, the head power ON signal E1022, and the motor power ON signal E1023, and exchanges signals with the parallel I/F E10016 and the serial I/F E0017. Also, the ASIC E1006 senses the statuses of a PE sensing signal (PES) E1025 from the PE sensor E0007, an ASF sensing signal (ASFS) E1026 from the ASF sensor E0009, a GAP sensing signal (GAPS) E1027 from the GAP sensor E0008, and a PG sensing signal (PGS) E1032 from the PG sensor E0010, and transmits data indicating the statuses to the CPU E1001 through the control bus E1014. On the basis of the input data, the CPU E1001 controls driving of the LED driving signal E1038 to turn on and off the LED E0020.

Furthermore, the ASIC E1006 senses the status of an encoder signal (ENS) E1020 to generate a timing signal and interfaces with the printhead cartridge H1000 by a head control signal E1021, thereby controlling a printing operation. The encoder signal (ENC) E1020 is an output signal from the CR encoder sensor E0004, that is input through the flexible flat cable E0012. The head control signal E1021 is supplied to the printhead cartridge E1000 through the flexible flat cable E0012, the carriage printed circuit board E0013, and the contact FPC E0011.

Figure 9:
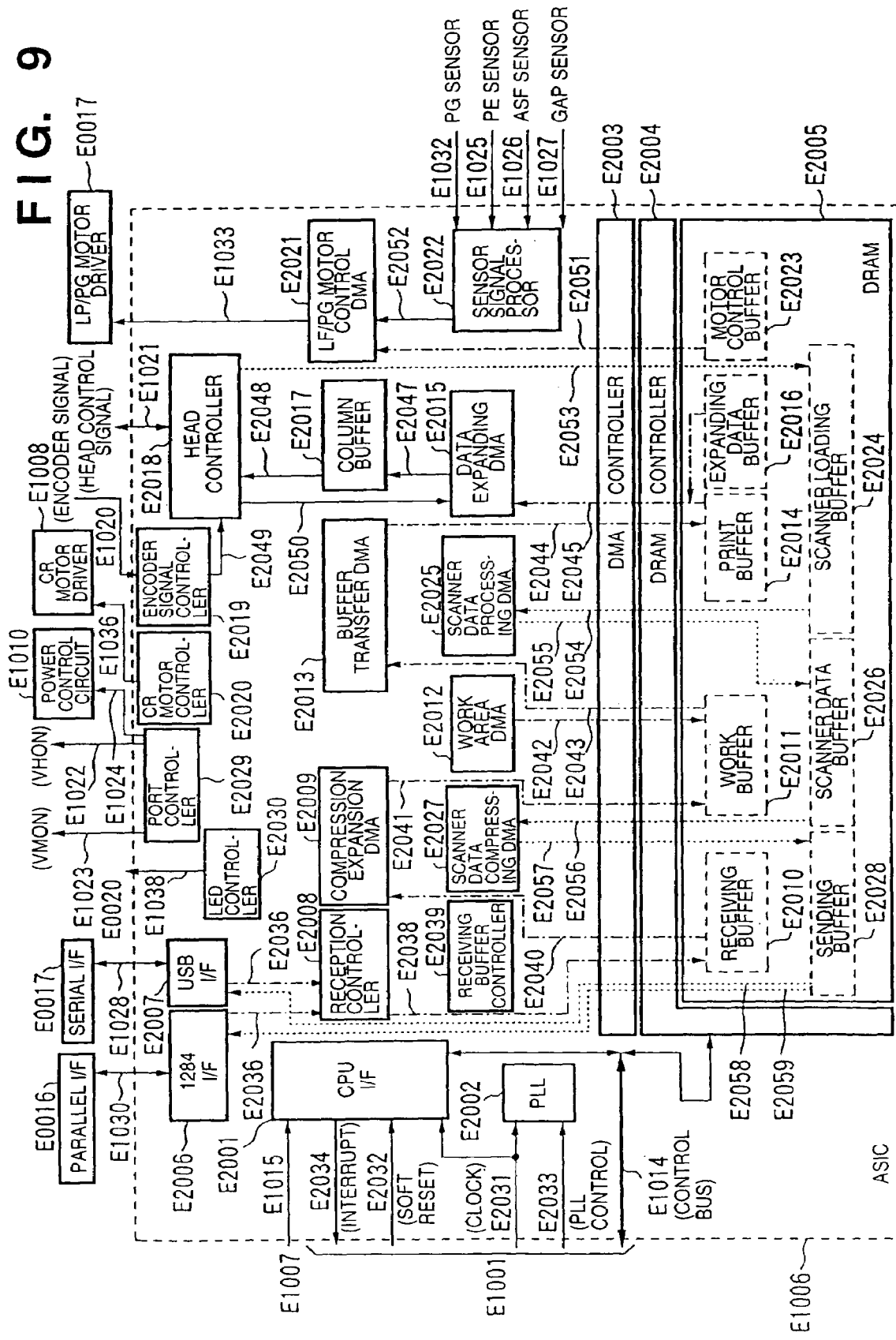
FIG. 9 is a block diagram showing the internal arrangement of an ASIC shown in FIG. 8.

FIG. 9 is a block diagram showing the internal arrangement of the ASIC E1006.

Referring to FIG. 9, only flows of data, such as printing data and motor control data, pertaining to control of the head and each mechanical part are shown in connections between individual blocks. Control signals and clocks concerning read and write of a built-in register in each block and control signals related to DMA control are omitted to avoid the complexity of description in the drawing.

As shown in FIG. 9, a PLL E2002 generates a clock (not shown) to be supplied to the most part of the ASIC E1006, in accordance with a clock signal (CLK) E2031 and PLL control signal (PLLON) E2033 output from the CPU E1001.

A CPU interface (CPU I/F) E2001 controls read and write to a register in each block (to be described below), supplies clocks to some blocks, and accepts an interrupt signal (none of these functions is shown), in accordance with the reset signal E1015, a soft reset signal (PDWN) E2032 and the clock signal (CLK) E2031 output from the CPU E1001, and a control signal from the control bus E1014. This CPU I/F E2001 outputs an interrupt signal (INT) E2034 to the CPU E1001 to inform the CPU E1001 of generating an interrupt in the ASIC E1006.

A DRAM E2005 has areas such as a receiving buffer E2010, work buffer E2011, print buffer E2014, and expanding data buffer E2016, as printing data buffers, and also has a motor control buffer E2023 for motor control. In addition to these printing data buffers, the DRAM E2005 has areas such as a scanner loading buffer E2024, scanner data buffer E2026, and sending buffer E2028, as buffers for use in a scanner operation mode.

This DRAM E2005 is also used as a work area necessary for the operation of the CPU E1001. That is, a DRAM controller E2004 switches between access from the CPU E1001 to the DRAM E2005 using the control bus and access from a DMA controller E2003 (to be described below) to the DRAM E2005, thereby performing read and write to the DRAM E2005.

The DMA controller E2003 accepts a request (not shown) from each block and outputs, to the RAM controller, an address signal and a control signal (neither is shown), or write data (E2038, E2041, E2044, E2053, E2055, or E2057) when a write operation is to be performed, thereby performing DRAM access. When a read operation is to be performed, the DMA controller E2003 transfers readout data (E2040, E2043, E2045, E2051, E2054, E2056, E2058, or E2059) from the DRAM controller E2004 to the block which has requested.

A 1284 I/F E2006 interfaces by two-way communication with an external host apparatus (not shown) through the parallel I/F E0016 under the control of the CPU E1001 via the CPU I/F E2001. Also, when printing is to be performed, the 1284 I/F E2006 transfers received data (PIF received data E2036) from the parallel I/F E0016 to a reception controller E2008 by DMA processing. When scanner read is to be performed, the 1284 I/F E2006 transmits data (1284 transmission data (RDPIF) E2059) stored in the sending buffer E2028 in the DRAM E2005 to the parallel I/F by DMA processing.

A USB I/F E2007 interfaces by two-way communication with an external host apparatus (not shown) through the serial I/F E0017 under the control of the CPU E1001 via the CPU I/F E2001. Also, when printing is to be performed, the USB I/F E2007 transfers received data (USB received data E2037) from the serial I/F E0017 to the reception controller E2008 by DMA processing. When scanner read is to be performed, the USB I/F E2007 transmits data (USB transmission data (RDPIF) E2058) stored in the sending buffer E2028 in the DRAM E2005 to the serial I/F by DMA processing. The reception controller E2008 writes received data (WDIF) E2038 from a selected one of the 1284 I/F E2006 and the USB I/F E2007 into a receiving buffer write address managed by a receiving buffer controller E2039.

A compression-expansion DMA E2009 reads out, under the control of the CPU E1001 via the CPU I/F E2001, received data (raster data) stored on the receiving buffer E2010 from a receiving buffer read address managed by the receiving buffer controller E2039, compresses or expands readout data (RDWK) E2040 in accordance with a designated mode, and writes the data as a printing code string (WDWK) E2041 in the work buffer area.

A printing buffer transfer DMA E2013 reads out, under the control of the CPU E1001 via the CPU I/F E2001, printing codes (RDWP) E2043 on the work buffer E2011, rearranges each printing code into an address on the print buffer E2014, which is suitable for the order of data transfer to the printhead cartridge H1000, and transfers the code (WDWP E2044). A work clear DMA E2012 repeatedly transfers and writes, under the control of the CPU E1001 via the CPU I/F E2001, designated work file data (WDWF) E2042 in a region on the work buffer to which the data is completely transferred by the printing buffer transfer DMA E2015.

A printing data expanding DMA E2015 reads out, under the control of the CPU E1001 via the CPU I/F E2001, the printing codes rearranged and written on the print buffer and expanding data written on the expanding data buffer E2016, by using a data expansion timing signal E2050 from a head controller E2018 as a trigger, thereby generating expanded printing data (WDHDG) E2045, and writes the generated data as column buffer write data (WDHDG) E2047 in a column buffer E2017. This column buffer E2017 is an SRAM for temporarily storing data (expanded printing data) to be transferred to the printhead cartridge H1000. The column buffer E2017 is shared and managed by the printing data expanding DMA and the head controller in accordance with a handshake signal (not shown) of these two blocks.

Under the control of the CPU E1001 via the CPU I/F E2001, this head controller E2018 interfaces with the printhead cartridge H1000 or the scanner via a head control signal. In addition, on the basis of a head driving timing signal E2049 from an encoder signal processor E2019, the head controller E2018 outputs a data expansion timing signal E2050 to the printing data expanding DMA.

When printing is to be performed, the head controller E2018 reads out expanded printing data (RDHD) E2048 from the column buffer in accordance with the head driving timing signal E2049. The head controller E2018 outputs the readout data to the printhead cartridge H1000 via the head control signal E1021.

In a scanner read mode, the head controller E2018 transfers loaded data (WDHD) E2053 input via the head control signal E1021 to the scanner loading buffer E2024 on the DRAM E2005 by DMA transfer. A scanner data processing DMA E2025 reads out, under the control of the CPU E1001 via the CPU I/F E2001, loading buffer readout data (RDAV) E2054 stored in the scanner loading buffer E2024 into a scanner data buffer E2026 on the DRAM E2005 and writes processed data (WDAV) E2055, subjected to processing such as averaging, into the scanner data buffer E2016 on the DRAM E2005.

A scanner data compressing DMA E2027 reads out processed data (RDYC) E2056 on the scanner data buffer E2026, compresses the data, and writes compressed data (WDYC) E2057 in the sending buffer E2028, under the control of the CPU E1001 via the CPU I/F E2001.

The encoder signal processor E2019 receives an encoder signal (ENC) and outputs the head driving timing signal E2049 in accordance with a mode determined by the control of the CPU E1001. In addition, the encoder signal processor E2019 stores information concerning the position or speed of the carriage M4001, obtained from the encoder signal E1020, into a register and provides the information to the CPU E1001. On the basis of this information, the CPU E1001 determines various parameters for controlling the CR motor E0001. A CR motor controller E2020 outputs a CR motor control signal E1036 under the control of the CPU E1001 via the CPU I/F E2001.

A sensor signal processor E2022 receives output sensing signals from, e.g., the PG sensor E0010, the PE sensor E0007, the ASF sensor E0009, and the GAP sensor E0008, and transmits these pieces of sensor information to the CPU E1001 in accordance with a mode determined by the control of the CPU E1001. The sensor signal processor E2022 also outputs a sensor signal E2052 to an LF/PG motor control DMA E2021.

Under the control of the CPU E1001 via the CPU I/F E2001, this LF/PG motor control DMA E2021 reads out a pulse motor driving table (RDPM) E2051 from a motor control buffer E2023 on the DRAM E2005 and outputs a pulse motor control signal E. In addition, the LF/PG motor control DMA E2021 outputs a pulse motor control signal E1033 by using the abovementioned sensor signal as a trigger of the control.

An LED controller E2030 outputs an LED driving signal E1038 under the control of the CPU E1001 via the CPU I/F E2001. A port controller E2029 outputs the head power ON signal E1022, the motor power ON signal E1023, and the power control signal E1024 under the control of the CPU E1001 via the CPU I/F E2001.

Figure 10:
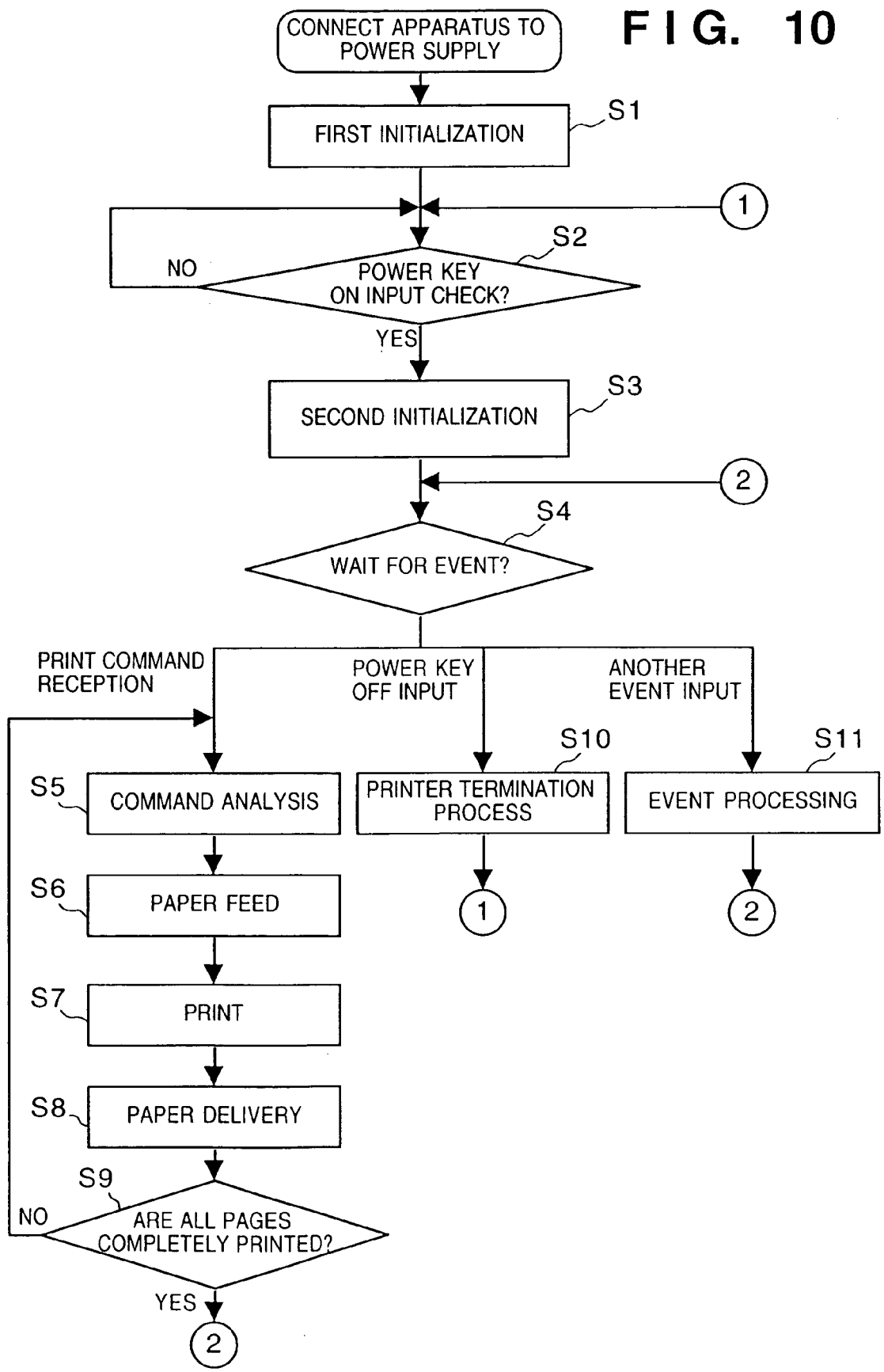
FIG. 10 is a flow chart showing the operation of the embodiment of the present invention.

The operation of the inkjet printing apparatus of this embodiment of the present invention constructed as above will be described below with reference to a flow chart in FIG. 10.

When this apparatus is connected to the AC power supply, in step S1 first initialization is performed for the apparatus. In this initialization, the electric circuit system including, e.g., the ROM and RAM of this apparatus is checked, thereby checking whether the apparatus can normally operate electrically.

In step S2, whether the power key E0018 on the upper case M1002 of the apparatus main body M1000 is pressed is checked. If the power key E0018 is pressed, the flow advances to step S3 to perform second initialization.

In this second initialization, the various driving mechanisms and the head system of this apparatus are checked. That is, whether the apparatus is normally operable is checked in initializing the various motors and loading head information.

In step S4, an event is waited for. That is, a command event from the external I/F, a panel key event by a user operation, or an internal control event with respect to this apparatus is monitored. If any of these events occurs, processing corresponding to the event is executed.

For example, if a printing command event is received from the external I/F in step S4, the flow advances to step S5. If a power key event by a user operation occurs in step S4, the flow advances to step S10. If another event occurs in step S4, the flow advances to step S11.

In step S5, the printing command from the external I/F is analyzed to determine the designated paper type, sheet size, printing quality, and paper feed method. Data indicating these determination results is stored in the RAM E2005 of the apparatus, and the flow advances to step S6.

In step S6, paper feed is started by the paper feed method designated in step S5. When the sheet is fed to a printing start position, the flow advances to step S7.

In step S7, printing is performed. In this printing, printing data supplied from the external I/F is once stored in the printing buffer. Subsequently, the CR motor E0001 is driven to start moving the carriage M4001 in the scanning direction, and the printing data stored in the print buffer E2014 is supplied to the printhead cartridge H1000 to print one line. When the printing data of one line is completely printed, the LF motor E0002 is driven to rotate an LF roller M3001 to feed the sheet in the sub-scan direction. After that, the above operation is repeatedly executed. When printing of the printing data of one page supplied from the external I/F is completed, the flow advances to step S8.

In step S8, the LF motor E0002 is driven to drive a sheet delivery roller M2003. Sheet feed is repeated until it is determined that the sheet is completely delivered from this apparatus. When this operation is completed, the sheet is completely delivered onto the sheet delivery tray M1004a.

In step S9, whether printing of all pages to be printed is completed is checked. If pages to be printed remain, the flow returns to step S5 to repeat the operation in steps S5 to S9 described above. When printing of all pages to be printed is completed, the printing operation is completed. After that, the flow returns to step S4 to wait for the next event.

In step S10, a printer termination process is performed to stop the operation of this apparatus. That is, to shut off the power supply to the various motors and the head, the operation transits to a state in which the power supply can be shut off. After that, the power supply is shut off, and the flow returns to step S4 to wait for the next event.

In step S11, event processing other than the above is performed. For example, processing corresponding to any of the diverse panel keys of this apparatus, a recovery command from the external I/F, or an internally occurring recovery event is performed. After the processing, the flow advances to step S4 to wait for the next event.

Figure 11:
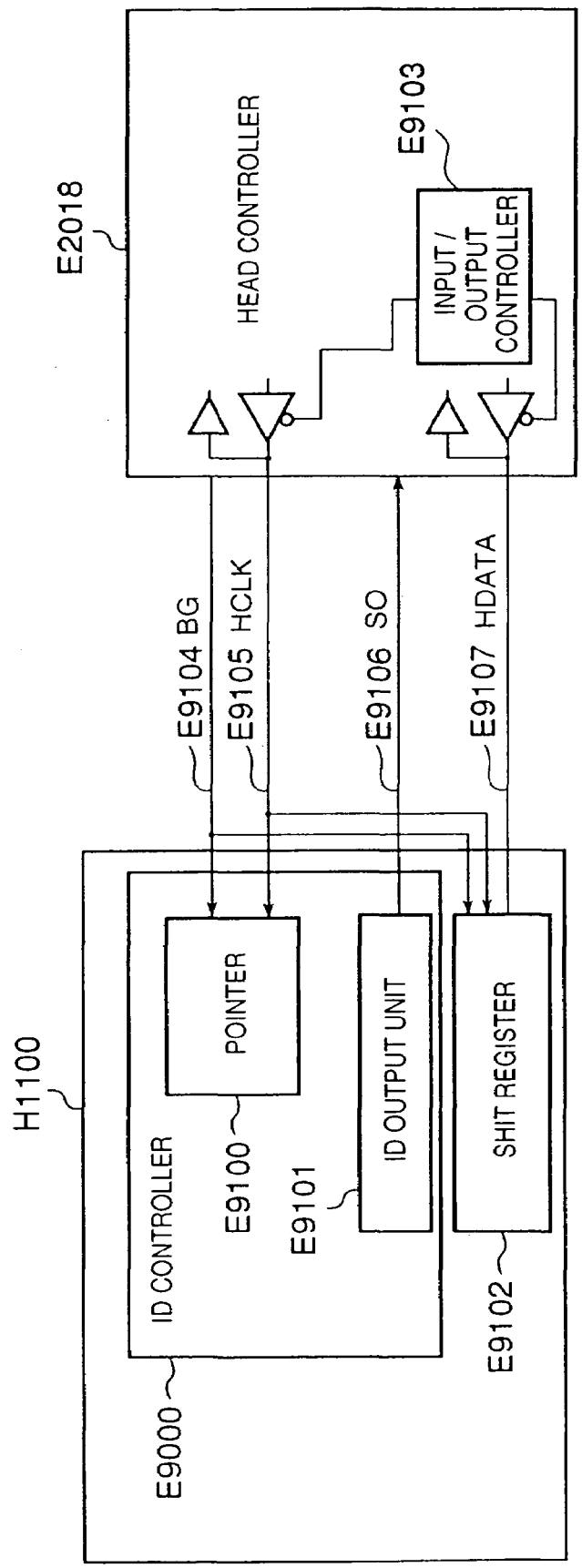
FIG. 11 is a block diagram illustrating the connection to a head controller in a case where a printhead cartridge has been attached.

FIG. 11 is a block diagram illustrating the electrical connection between a printing element board H1100 within a printhead cartridge H1000, which has been attached to a printer carriage M4001, and a head controller E2018 provided within an ASIC E1006 of a main PCB E0014. In this embodiment, an ID controller E9000 is provided on the printing element board H1100. However, it may be provided on an electrical circuit board H1300 if so desired.

The head controller E2018 and ID controller E9000 are connected by lines for a latch signal (BG) E9104, a clock signal (HCLK) E9105 and a signal (SO) E9106. Control data (HDATA) E9107 is transmitted from the head controller E2018 to a shift register E9102 on the printing element board H1100.

The ID controller E9000 is provided internally with an ID output unit E9101 capable of storing and outputting, in the form of a bit sequence, identification information (referred to as an "ID value" below), which is specific information for identification purposes or information indicating the characteristics of the device, and a pointer E9100 for pointing to an address of one bit output from the ID output unit E9101. The shift register E9102, which is provided on the head chip, successively accepts the control data (HDATA) E9107 input thereto from the head controller E2018 in sync with the clock signal (HCLK) E9105, latches this data at the rising edge of the latch signal (BG) E9104 and drives the printer nozzles, which are the printing elements.

The head controller E2018 has an input/output control unit E9103 for switching between signal output/input by using the lines for the control data signal (HDATA) E9107 and clock signal (HCLK) E9105.

Operation is as follows when an ID value is read: First, with the latch signal BG at the "H" logic level, the pointer E9100 is initialized and points to the address of a predetermined bit of the ID output unit E9101. Whenever the latch signal BG assumes the "L" level and the rising edge of the clock signal HCLK is detected, the pointer E9100 successively increments the address and points to the next bit. The ID output unit E9101 outputs the bit data of the address pointed to by the pointer E9100 serially on the line for the output signal (SO) E9106. The head controller E2018, on the other hand, outputs the control data signal (HDATA) E9107 and clock signal (HCLK) E9105 by means of the input/output control unit E9103 in accordance with control exercised by a CPU E1001.

Figure 12:
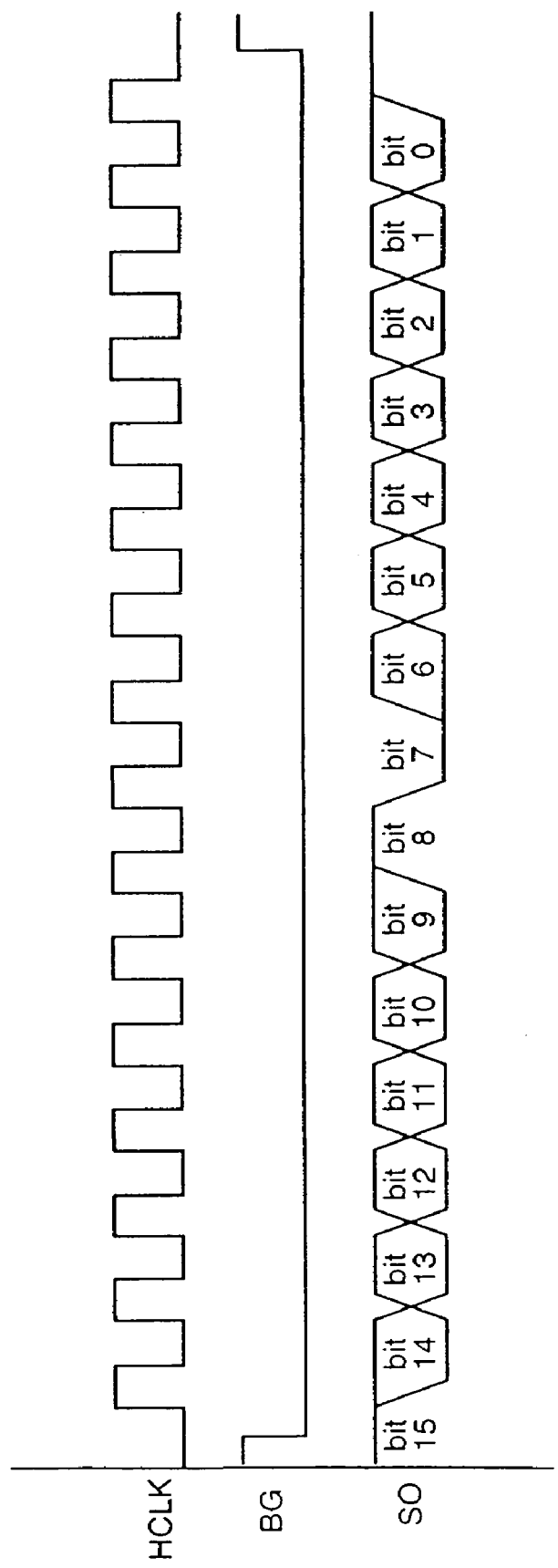
FIG. 12 is a timing chart illustrating the states of various signals when an ID value is read in the connection of FIG. 11.

FIG. 12 is a timing chart illustrating the states of various signals mentioned above when an ID value is read. The head controller E2018 outputs 16 clock pulses of the clock signal HCLK while the latch signal BG is at the "L" level. In sync with the clock signal HCLK, the ID controller E9000 transmits, one bit at a time, the 16 bits from the $15^{th}$ bit to the $0^{th}$ bit as the output signal SO. The head controller E2018 receives the output signal SO and thus obtains the 16-bit information corresponding to the ID value.

In this embodiment, the $8^{th}$ and $7^{th}$ bits are set as "specific bits". In a case where the printhead cartridge H1000 has been mounted on the carriage M4001, the bits are set in such a manner that the $8^{th}$ and $7^{th}$ bits will be "1" and "0", respectively. The values of the other bits become "1" or "0" in accordance with the content of other identifying information (rank information) such as the resistance values of the electrothermal transducers (heaters) of the printing elements and the ON resistance values of driving transistors.

In this embodiment, the fact that the printhead cartridge H1000 has been mounted on the carriage M4001 is identified only in a case where it is confirmed that the values of the two "specific bits" are "1" and "0" for the $8^{th}$ and $7^{th}$ bits, respectively. This makes it possible to greatly reduce instances where the printhead cartridge and scanner are misrecognized, as will be described later.

Figure 13:
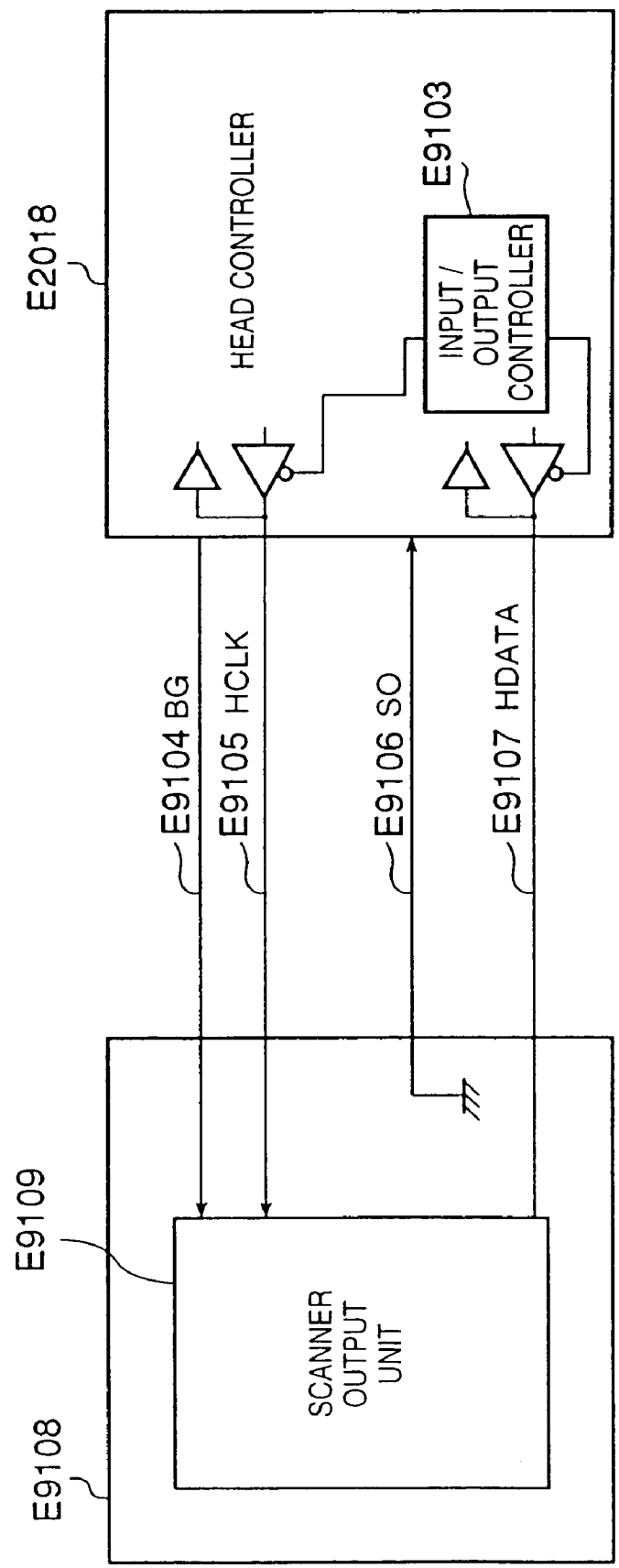
FIG. 13 is a block diagram illustrating the connection to a head controller in a case where a scanner has been attached.

FIG. 13 is a block diagram illustrating the electrical connection between a circuit board E9108 in a scanner M6000, which has been mounted on the printer carriage M4001, and the head controller E2018 provided within the ASIC E1006 of the main PCB E0014.

The circuit board E9108 within the scanner has a scanner output unit E9109 and is connected to the head controller E2018 by lines for the latch signal (BG) E9104, the clock signal (HCLK) E9105 and the control data (HDATA). Unlike the case in which the printhead cartridge H1000 shown in FIG. 11 is mounted, the signal (SO) E9106 is grounded electrically within the scanner circuit board E9108 so as to be fixed at logical "0".

In the initial state following mounting of the scanner, the set-up is such that the scanner output unit E9109 will receive the clock HCLK and control data HDATA signals so as to read the ID value from the head controller E2018. Reading of the ID value by the CPU and various settings are carried out via the head controller E2018. The scanner output unit E9109 is set in such a manner that when this initial setting is completed, the scanner output unit E9109 transmits the clock HCLK and the control data signal HDATA and, using the change in the state of the latch signal BG from "H" to "L" as a trigger, transfers the image data that has been read. Meanwhile, if the ID value is read and the fact that the scanner has been mounted is identified, the head controller E2018 switches over so as to receive the signals by using the lines for the control data signal HDATA and clock signal HCLK.

Figure 14:
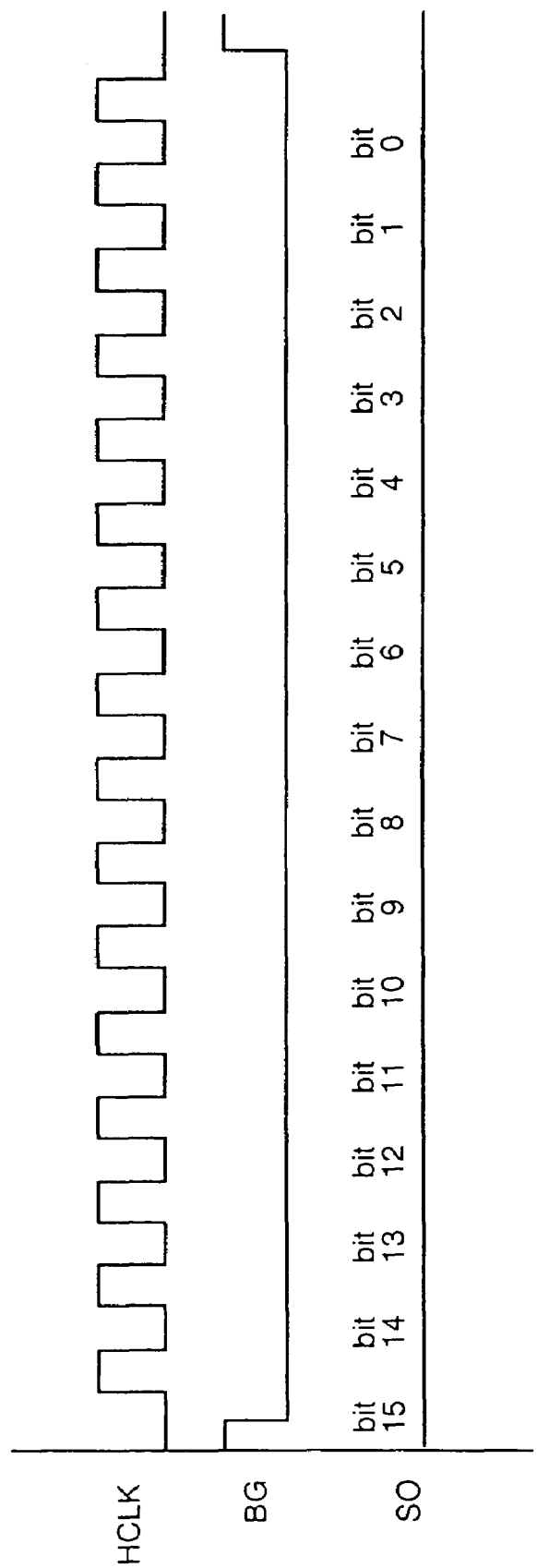
FIG. 14 is a timing chart illustrating the states of various signals when an ID value is read in the connection of FIG. 13.

FIG. 14 is a timing chart illustrating the states of various signals mentioned above when an ID value is read. The head controller E2018 outputs 16 clock pulses of the clock signal HCLK while the latch signal BG is at the "L" level. Since the SO signal within the scanner circuit board E9108 has been fixed at "0", the 16 bits of data received by the head controller E2018 are all "0" and the ID value is "000H".

Thus, as described above, the head controller E2018 identifies that the device that has been mounted on the carriage M4001 is the printhead cartridge H1000 or the scanner M6000 based upon the ID value received via the signal SO.

Processing for identifying the device that has been mounted on the carriage M4001 will now be described in greater detail.

In general, conventional processing for identifying a device that has been attached to a printer involves judging that the printhead cartridge has been attached if the read ID value is not the ID value of the scanner. This arises from the fact that whereas there are two types of printhead cartridges that can be attached to many printers, namely a cartridge which supports monochrome printing and a cartridge which supports color printing, there usually in only type of scanner that can be attached.

However, in a case where the scanner has not been attached correctly or in a case where the scanner and the printer have not been electrically connected correctly, the printer may decide that the read ID value is not that of the scanner even though the scanner has been attached and may therefore recognize, erroneously, the printhead cartridge as being attached.

In a case where the attached device is thus recognized incorrectly, the input and output directions of the HCLK and HDATA signals pose a particular problem. As seen from the head controller E2018 of the printer, operation following the reading of the ID value is such that signals are output with regard to the printhead cartridge and signals are input with regard to the scanner, as described above. Consequently, in a case where the printhead cartridge is recognized as being attached regardless of the fact that the scanner has been attached in the example of misrecognition mentioned above, signals from the scanner and signals from the printer collide and there is a possibility that the costly printer will be damaged.

Conversely, in a case where the scanner is recognized as being attached regardless of the fact that the printhead cartridge has been attached, there is a possibility that the printhead cartridge will scanned while in contact with the document (printing medium) in an effort to perform a reading operation. In this case the surface of the nozzles may be damaged and there may be an adverse effect upon printing quality and printhead lifetime.

In order to avoid damage to the device as a consequence of such misrecognition, the present embodiment is so adapted that the fact that the printhead cartridge H1000 has been mounted on the carriage M4001 is identified only in a case where it is confirmed that the values of the two "specific bits", namely the $8^{th}$ and $7^{th}$ bits, are "1" and "0", respectively. This makes it possible to greatly reduce instances where the printhead cartridge and scanner are misrecognized.

If there were only one specific bit and the state of the electrical connection were to fluctuate between "0" and "1" owing to incorrect attachment of the device, the value of the bit might be misrecognized as being the set value, depending upon the timing at which the value of the bit is read. Accordingly, in order to confirm more reliably the fact that the printhead cartridge has been attached correctly, it is preferred that two or more specific bits be used.

For the same reason, it is preferred in terms of obtaining reliable confirmation that these two or more specific bits be transmitted in succession and that the values of mutually adjacent specific bits be different from each other, i.e., that "1" and "0" logic values alternate.

Figure 15:
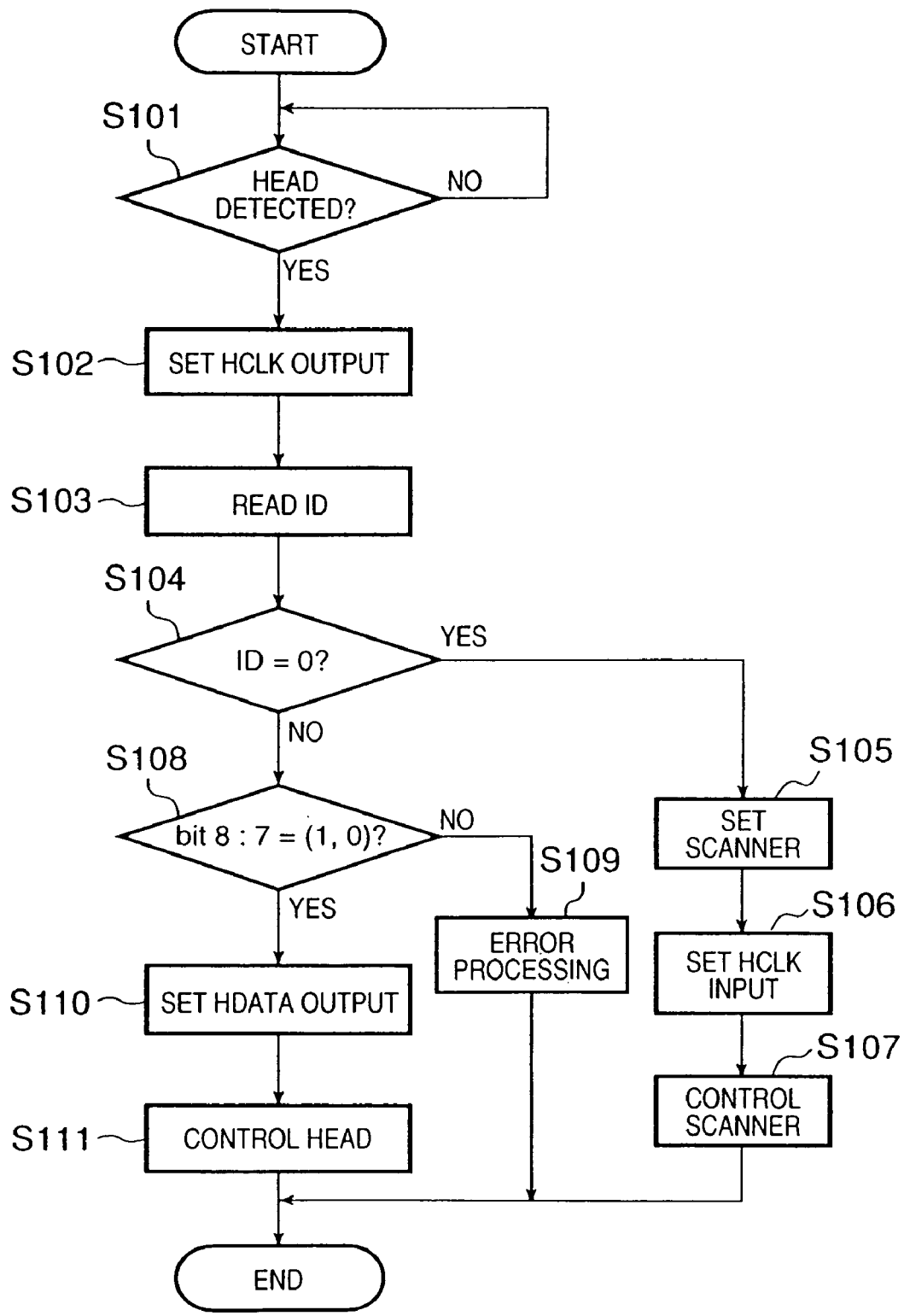
FIG. 15 is a flowchart illustrating processing for identifying an attached device.

Processing on the side of the printer relating to identification of an attached device according to this embodiment will now be described with reference to the flowchart of FIG. 15.

At the start a head detection signal E1013 is monitored to detect whether a device has been attached or not (step S101). If the fact that a device has been attached is detected at step S101, the HCLK signal is set to the output state (step S102) by the input/output control unit E9103 within the head controller E2018 and the ID value of the attached device is read (step S103).

Next, it is determined whether the read ID value is "000H" (step S104). If the answer is "YES", then it is judged that the scanner has been attached, the mode for operating the scanner is set (step S105), the input/output control unit E9103 is changed over to set the HCLK signal to input (step S106) and a transition is made to the scanner control mode (step S107).

On the other hand, if it is found at step S104 that the read ID value is not "000H" ("NO" at step S104), then, in order to confirm that the printhead cartridge has been attached, the values of the $8^{th}$ and $7^{th}$ bits of the ID value are checked to see whether they are "1" and "0", respectively (step S108). If these values do not) coincide with the above, that is, if the values of the $8^{th}$ and $7^{th}$ bits are not "1" and "0", respectively, then it is judged that the electrical connection is faulty, error processing such as the display of an error message is executed (step S109) and then control is exited.

If it is found at step S108 that the values of the $8^{th}$ and $7^{th}$ bits are "1" and "0", respectively, then it is judged that the printhead cartridge has been attached correctly, the HCLK signal is set to the output state by the input/output control unit E9103 (step S110), a transition is made to the mode for controlling the printhead (step S111) and processing is exited.

Thus, in accordance with this embodiment as described above, the possibility that a connected device will be damaged owing to misrecognition of the device on the printer side can be greatly reduced without internally providing the scanner with a special ID output unit. In other words, this can be achieved while the structure of the scanner is kept simple.

The description given upon is focused on control relating to device identification. In the printer of this embodiment, control is altered in many ways based upon the identified device after such identification has been made. Some of these will now be described.

(Acquisition of Detailed Device Information)

In the case of the printhead cartridge, information that has been stored in a non-volatile storage medium such as an EEPROM mounted on the printing element board H1100 is read out. In the case of the scanner, the HCLK/HDATA signals are controlled and control-related information is read out.

(Acquisition of Temperature Information)

In the case of the printhead cartridge, information relating to the temperature of the printing element board H1100 is read out serially from a temperature sensing circuit provided on the board H1100, and the read information is reflected in control of printing. In the case of the scanner, an analog signal E1012 from a thermister provided on a carriage board E0013 is converted to a digital signal and is reflected in control as information relating to the ambient temperature in the room in which the printer is located.

(Two-way Registration Adjustment)

In the case of the printhead cartridge, a value which takes into account the time required for ink to reach the paper from the nozzle surface is adopted as a parameter for adjustment of two-way registration. This parameter is used for registration adjustment of printing positions of the printhead cartridge for bidirectional scanning in the forward direction and the backward direction. In the case of the scanner described in this embodiment, it is unnecessary to take a value of this kind into account.

Changeover of control in this manner is performed based upon the identification of the attached device. It is necessary to identify the device correctly in order to achieve normal reading of an image and to obtain high-quality printing. Device identification according to this embodiment contributes to stabilization of the control operations described above.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention.

In the present invention, the above-mentioned film boiling system is most effective for the above-mentioned inks.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program. In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In the case where the present invention is provided in the form of the above storage medium, the storage medium stores program codes corresponding to the above mentioned flow charts and/or timing charts.

As many apparently widely different embodiments of the present invention can be made without departing from the spirit and scope thereof, it is to be understood that the invention is not limited to the specific embodiments thereof except as defined in the appended claims.

What is claimed is:

1. A multifunction apparatus, adapted such that any device of a plurality of types of devices can be selectively attached thereto, for executing control on an attached device, wherein the control differs depending upon the type of device attached, said apparatus comprising:

transmitting means for transmitting a timing signal to the attached device for acquiring identifying information stored in the attached device;

receiving means for receiving the identifying information, represented as digital information comprising a plurality of bits of information, including specific data indicating the type of the attached device and characteristic data of the attached device that has been transmitted serially from the attached device in accordance with the timing signal;

determination means for determining, whether the attached device is a device of a specific type, based on bits of information contained in the specific data; and control means for exercising control on the attached device, upon construing that the attached device is of the specific type based on the determination made by said determination means, wherein the plurality of types of devices include a scanner unit for reading a document image and a printhead cartridge for use in outputting an image to a printing medium, and wherein said determination means determines that the attached device is the scanner unit if all bits of information in the specific data correspond to zero, and instead determines that the attached device is the printhead cartridge, if values of successive bits in the specific data correspond to 1 and 0 respectively, and wherein otherwise, said determination means determines that the attached device has not been electrically connected correctly.

2. An apparatus according to claim 1, wherein the printhead cartridge includes an ink-jet printhead for printing by discharging ink, and an ink tank containing ink supplied to the printhead.

3. An apparatus according to claim 2, wherein the printhead is of a type that discharges ink by utilizing thermal energy and that has a thermal energy converter for generating thermal energy applied to the ink.

4. A method of identifying a device that has been attached to a multifunction apparatus, adapted such that any device of a plurality of types of devices can be selectively attached thereto, for executing control on an attached device, wherein the control differs depending upon the type of device attached, said method comprising the steps of:

transmitting a timing signal to the attached device for acquiring identifying information stored in an attached device;

receiving the identifying information, represented as digital information comprising a plurality of bits of information, including specific data indicating the type of the attached device and characteristic data of the attached device that has been transmitted serially from the attached device in accordance with the timing signal;

determining, whether the attached device is a device of a specific type, based on bits of information contained in the specific data; and exercising control on the attached device, upon construing that the attached device is of the specific type based on the determination made in said determining step, wherein the plurality of types of devices include a scanner unit for reading a document image and a printhead cartridge for use in outputting an image to a printing medium, and wherein said determining step includes determining that the attached device is the scanner unit, if all bits of information in the specific data correspond to zero and instead determining that the attached device is the printhead cartridge, if values of successive bits in the specific data correspond to 1 and 0 respectively, and determining, otherwise, that the attached device has not been electrically connected correctly.

5. A computer program product stored in a computer-readable medium and executed by a multifunction apparatus, adapted such that any device of a plurality of types of devices can be selectively attached thereto, for executing control on an attached device, wherein the control differs depending upon the type of device attached, said computer program product having program code comprising:

code for transmitting a timing signal to the attached device for acquiring identifying information stored in an attached device;

code for receiving the identifying information, represented as digital information comprising a plurality of bits of information, including specific data indicating the type of the attached device and characteristic data of the attached device that has been sent serially from the attached device in accordance with the timing signal;

code for determining, whether the attached device is a device of a specific type, based on bits of information contained in the specific data; and code for exercising control on the attached device, upon construing that the attached device is of the specific type based on the determination made in said determining step, wherein the plurality of types of devices include a scanner unit for reading a document image and a printhead cartridge for use in outputting an image to a printing medium, and wherein said determining step includes determining that the attached device is the scanner unit, if all bits of information in the specific data correspond to zero, and instead determining that the attached device is the printhead cartridge, if values of successive bits in the specific data correspond to 1 and 0 respectively, and determining, otherwise, that the attached device has not been electrically connected correctly.

6. A computer-readable storage medium storing a computer program executed by a multifunction apparatus, adapted such that any device of a plurality of types of devices can be selectively attached thereto, for executing control on an attached device that differs depending upon the type of device attached, said computer program comprising program code comprising:

code for transmitting a timing signal to the attached device for acquiring identifying information stored in an attached device;

code for receiving the identifying information, represented as digital information comprising a plurality of bits of information, including specific data indicating the type of the attached device and characteristic data of the attached device that has been sent serially from the attached device in accordance with the timing signal;

code for determining, whether the attached device is a device of a specific type, based on bits of information contained in the specific data; and code for exercising control on the attached device, upon construing that the attached device is of the specific type based on the determination made in said determining step, wherein the plurality of types of devices include a scanner unit for reading a document image and a printhead cartridge for use in outputting an image to a printing medium, and wherein said determining step includes determining that the attached device is the scanner unit, if all bits of information in the specific data correspond to zero, and instead determining that the attached device is the printhead cartridge, if values of successive bits in the specific data correspond to 1 and 0 respectively, and determining, otherwise, that the attached device has not been electrically connected correctly.

* * * * *

UNITED STATES PATENT AND TRADEMARK OFFICE
CERTIFICATE OF CORRECTION

| | | |
|---|---|---|
| PATENT NO. | : 7,042,596 B1 | Page 1 of 1 |
| APPLICATION NO. | : 09/640663 | |
| DATED | : May 9, 2006 | |
| INVENTOR(S) | : Takashi Yoshida | |

It is certified that error appears in the above-identified patent and that said Letters Patent is hereby corrected as shown below:

ON TITLE PAGE AT (56) U.S. PATENT DOCUMENTS

Insert: --2003/0193694  10/2003   Shimazawa et al.--.

COLUMN 14

Line 63, "in only" should read --is only one--.

COLUMN 16

Line 4, "not)" should read --not--.

Signed and Sealed this

Fourteenth Day of November, 2006

JON W. DUDAS
*Director of the United States Patent and Trademark Office*